(12) United States Patent
Zhang

(10) Patent No.: US 12,377,848 B2
(45) Date of Patent: Aug. 5, 2025

(54) METHOD OF OUTPUTTING PROMPT INFORMATION, DEVICE, MEDIUM, AND VEHICLE

(71) Applicant: BEIJING BAIDU NETCOM SCIENCE TECHNOLOGY CO., LTD., Beijing (CN)

(72) Inventor: Xin Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 357 days.

(21) Appl. No.: 18/085,742

(22) Filed: Dec. 21, 2022

(65) Prior Publication Data

US 2023/0126172 A1    Apr. 27, 2023

(30) Foreign Application Priority Data

Dec. 22, 2021   (CN) .......................... 202111584991.9

(51) Int. Cl.
*B60W 30/18*    (2012.01)
*B60W 30/095*   (2012.01)
(Continued)

(52) U.S. Cl.
CPC .... *B60W 30/18163* (2013.01); *B60W 30/095* (2013.01); *B60W 50/14* (2013.01); *G01C 21/3658* (2013.01); *B60W 2552/53* (2020.02)

(58) Field of Classification Search
CPC ......... B60W 30/18163; B60W 30/095; B60W 50/14; B60W 2552/53; B60W 2520/10;
(Continued)

(56) References Cited

U.S. PATENT DOCUMENTS

2005/0192727 A1* 9/2005 Shostak ............... G07C 5/0808
                                                        701/1
2005/0273218 A1* 12/2005 Breed ................ G06K 7/10178
                                                        701/2
(Continued)

FOREIGN PATENT DOCUMENTS

CN    106364486    2/2017
CN    107749194    3/2018
(Continued)

*Primary Examiner* — Hunter B Lonsberry
*Assistant Examiner* — Jalal C Coduroglu
(74) *Attorney, Agent, or Firm* — Pillsbury Winthrop Shaw Pittman, LLP

(57) ABSTRACT

A method of outputting a prompt information, a device, a medium, and a vehicle, which relate to a field of artificial intelligence, in particular to a field of assisted driving, a field of intelligent transportation and a field of computer vision. The method of outputting the prompt information may include: determining a type of an auxiliary prompt information in response to a determination that the auxiliary prompt information is required to be output, wherein the determination that the auxiliary prompt information is required to be output is performed according to a navigation information and an environment information; determining an output time of the auxiliary prompt information according to the type of the auxiliary prompt information; and outputting the auxiliary prompt information in response to the output time being reached.

20 Claims, 5 Drawing Sheets

(51) Int. Cl.
*B60W 50/14* (2020.01)
*G01C 21/36* (2006.01)

(58) Field of Classification Search
CPC ..... B60W 2554/20; B60W 2554/4041; B60W 2554/802; B60W 2556/20; B60W 2556/40; B60W 2556/50; B60W 2050/146; G01C 21/3658; G01C 21/3602; G01C 21/3492; B60K 35/10; B60K 35/22; B60K 35/265; B60K 35/60; B60K 35/85; B60K 2360/166; B60K 2360/168; B60K 2360/175; B60K 2360/178; B60K 2360/592; B60K 35/28; B60K 35/00

See application file for complete search history.

(56) References Cited

U.S. PATENT DOCUMENTS

| | | | | |
|---|---|---|---|---|
| 2007/0057781 | A1* | 3/2007 | Breed | B60K 35/22 340/457.1 |
| 2014/0243023 | A1* | 8/2014 | Zhou | H04W 4/023 455/456.3 |
| 2014/0286644 | A1* | 9/2014 | Oshima | H04B 10/11 398/118 |
| 2015/0198692 | A1* | 7/2015 | Goto | G08G 1/161 342/385 |
| 2017/0264364 | A1* | 9/2017 | Aoyama | H04B 10/1141 |
| 2019/0168772 | A1* | 6/2019 | Emura | G06V 20/20 |
| 2019/0258251 | A1* | 8/2019 | Ditty | G05D 1/0274 |
| 2021/0253128 | A1* | 8/2021 | Nister | G05D 1/646 |
| 2021/0276586 | A1* | 9/2021 | Chen | G08G 1/167 |
| 2022/0135039 | A1* | 5/2022 | Jardine | B60W 10/20 701/26 |

FOREIGN PATENT DOCUMENTS

| | | |
|---|---|---|
| CN | 207328432 | 5/2018 |
| CN | 108470458 | 8/2018 |
| CN | 108470459 | 8/2018 |
| CN | 109141464 | 1/2019 |
| CN | 109584596 | 4/2019 |
| CN | 111258318 | 6/2020 |
| CN | 111361564 | 7/2020 |
| CN | 112606838 | 4/2021 |
| CN | 113401144 | 9/2021 |
| CN | 113525400 | 10/2021 |
| CN | 113587952 | 11/2021 |
| CN | 113811932 | 12/2021 |

* cited by examiner

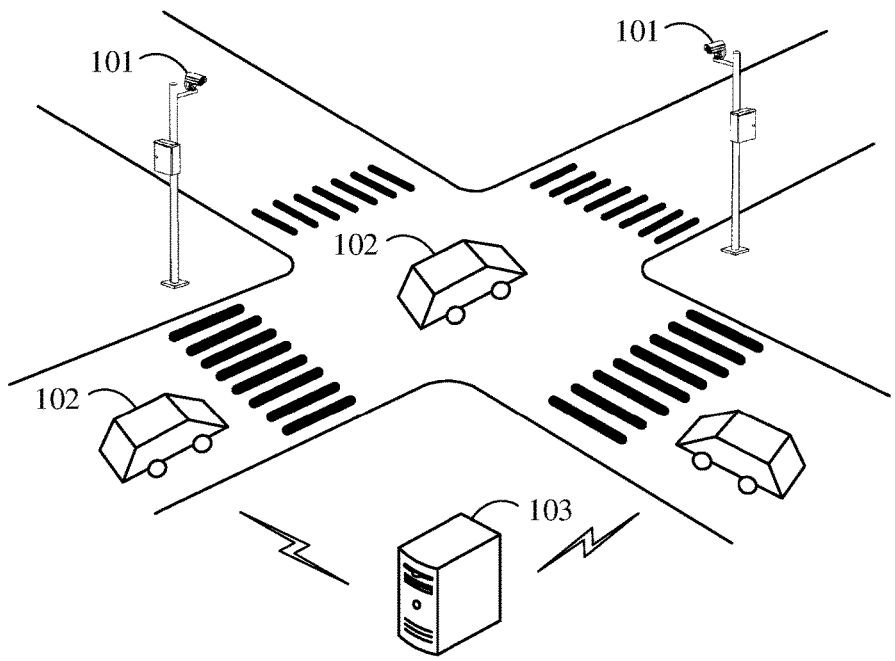

| A type of an auxiliary prompt information is determined in response to a determination that the auxiliary prompt information is required to be output, and the determination that the auxiliary prompt information is required to be output is performed according to a navigation information and an environment information | ⟵ S210 |

↓

| An output time of the auxiliary prompt information is determined according to the type of the auxiliary prompt information | ⟵ S220 |

↓

| The auxiliary prompt information is output in response to the output time being reached | ⟵ S230 |

FIG. 2

METHOD OF OUTPUTTING PROMPT INFORMATION, DEVICE, MEDIUM, AND VEHICLE

This application claims priority to Chinese Patent Application No. 202111584991.9 filed on Dec. 22, 2021, which is incorporated herein in its entirety by reference.

TECHNICAL FIELD

The present disclosure relates to a field of artificial intelligence, in particular to a field of assisted driving, a field of intelligent transportation and a field of computer vision, and more specifically to a method of outputting a prompt information, a device, a medium, and a vehicle.

BACKGROUND

With a development of an electronic technology and an Internet technology, intelligent vehicles have become one of development trends. An intelligent navigation may provide a driver with a more convenient and real travel experience through a voice guidance, an image guidance, or the like.

SUMMARY

A method of outputting a prompt information, a device, a medium, and a vehicle are provided to improve a guidance precision and a user experience.

According to an aspect of the present disclosure, a method of outputting a prompt information is provided, including: determining a type of an auxiliary prompt information in response to a determination that the auxiliary prompt information is required to be output, wherein the determination that the auxiliary prompt information is required to be output is performed according to a navigation information and an environment information; determining an output time of the auxiliary prompt information according to the type of the auxiliary prompt information; and outputting the auxiliary prompt information in response to the output time being reached.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method of outputting the prompt information provided by the present disclosure.

According to another aspect of the present disclosure, a non-transitory computer-readable storage medium having computer instructions therein is provided, and the computer instructions are configured to cause a computer to implement the method of outputting the prompt information provided by the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which:

FIG. 1 shows a schematic diagram of an application scenario of a method and an apparatus of outputting a prompt information according to embodiments of the present disclosure;

FIG. 2 shows a schematic flowchart of a method of outputting a prompt information according to embodiments of the present disclosure;

DETAILED DESCRIPTION OF EMBODIMENTS

Figure 3:
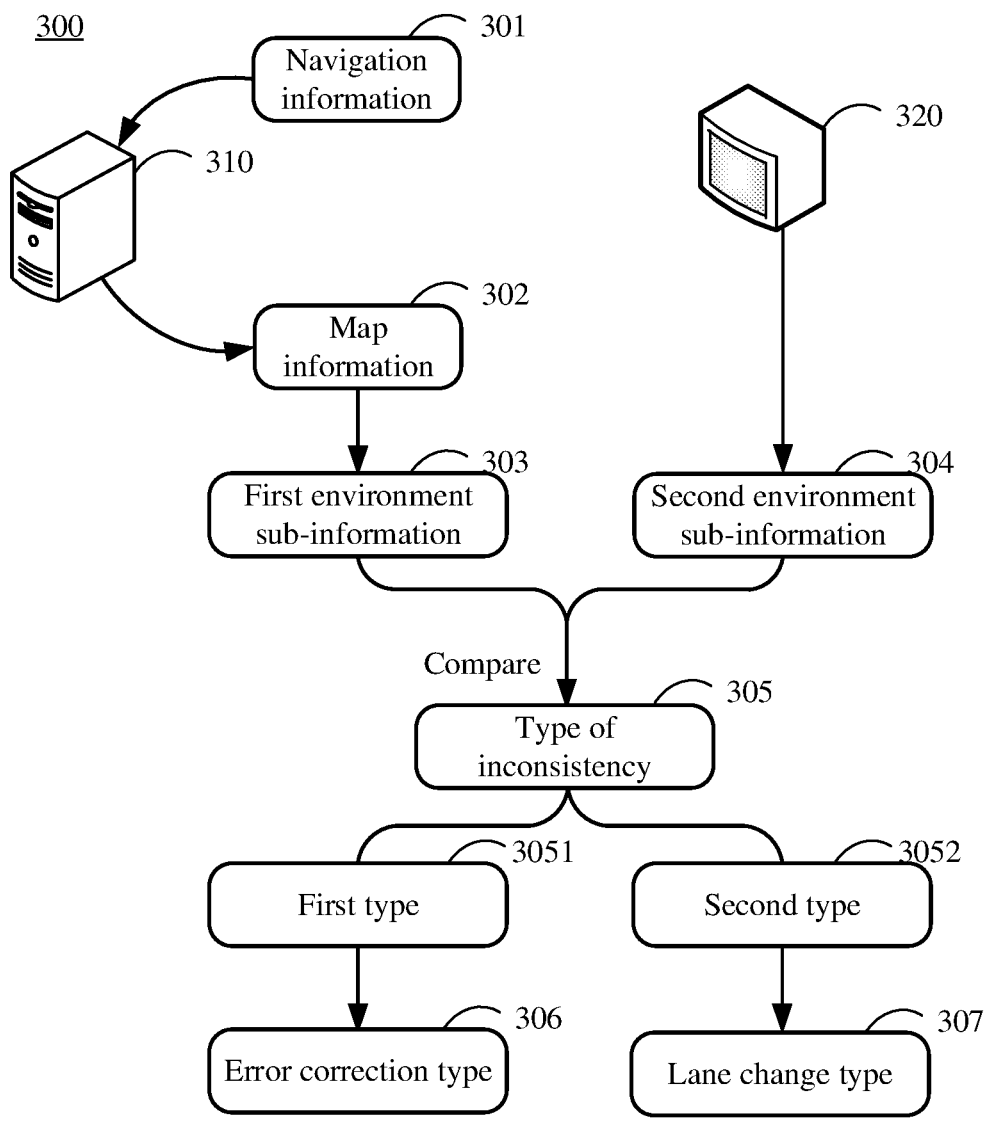
FIG. 3 shows a schematic diagram of a principle of a method of outputting a prompt information according to embodiments of the present disclosure.

Exemplary embodiments of the present disclosure will be described below with reference to accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

The present disclosure provides a method of outputting a prompt information, which includes a type determination stage, a time determination stage and an information output stage. In the type determination stage, a type of an auxiliary prompt information is determined in response to a determination that the auxiliary prompt information is required to be output, and the determination that the auxiliary prompt information is required to be output is performed according to a navigation information and an environment information. In the time determination stage, an output time of the auxiliary prompt information is determined according to the type of the auxiliary prompt information. In the information output stage, the auxiliary prompt information is output in response to the output time being reached.

The application scenario of the method and apparatus provided by the present disclosure will be described below with reference to FIG. 1.

FIG. 1 shows a schematic diagram of an application scenario of a method and an apparatus of outputting a prompt information according to embodiments of the present disclosure.

As shown in FIG. 1, an application scenario 100 of such embodiments may include a road, a vehicle 102 is driving on the road, and a roadside device 101 may be arranged on a side of the road.

The roadside device 101 may be, for example, an image capture device, which is used to capture an image of a vehicle, a pedestrian, etc. on the road. The road may be further provided with a traffic light at an intersection, and the roadside device 101 may further capture, for example, an image of the traffic light, or the like.

The vehicle 102 may be, for example, an automatic driving vehicle, an assisted driving vehicle, or the like. The vehicle 102 may be provided with a vehicle-mounted terminal, and the vehicle-mounted terminal may be installed with a client application such as a navigation application, a music playing application, a communication application, and so on. The vehicle-mounted terminal may, for example, communicate with the roadside device 101 through a network, so as to acquire an image captured by the roadside device 101. It may be understood that the vehicle 102 may be, for example, a motor vehicle or a non-motor vehicle.

In an embodiment, the vehicle 102 may be further provided with various sensors, such as a vehicle speed sensor, a long-range radar sensor, a camera, a lidar sensor, a short-range/medium-range radar sensor, an ultrasonic sensor, or the like. For example, the sensor on the vehicle 102 may be used to detect an environment information around the vehicle 102, and transmit the detected environment information to the client application via a CAN bus or the like.

In an embodiment, the vehicle-mounted terminal may recognize the image captured by the roadside device 101 or the environment information detected by the sensor, and transmit a recognition result to the navigation application, so that the auxiliary prompt information may be output according to the recognition result through the navigation application, and an auxiliary information may be provided to a driver or a passenger in addition to the navigation information.

In an embodiment, as shown in FIG. 1, the application scenario 100 may further include a server 103, and the vehicle-mounted terminal may communicate with the server 103 through a network. The server 103 may be, for example, a background management server supporting an operation of the navigation application. In such embodiments, the navigation application may send, for example, a route planning request or a map information acquisition request to the server 103 to obtain a route planning information or a map information.

It should be noted that the method of outputting the prompt information provided in the present disclosure may be performed by the vehicle-mounted terminal, and specifically, may be performed by the navigation application in the vehicle-mounted terminal. Accordingly, the apparatus of outputting the prompt information provided by the present disclosure may be arranged in the vehicle-mounted terminal, or may be integrated in the navigation application in a form of a program module.

It should be understood that a number and a type of roadside device, vehicles and server in FIG. 1 are merely illustrative. According to implementation needs, any number and type of roadside devices, vehicles and servers may be provided.

A method of outputting a prompt information provided by the present disclosure will be described in detail below with reference to FIG. 1 and FIG. 2 to FIG. 5.

FIG. 2 shows a flowchart of a method of outputting a prompt information according to embodiments of the present disclosure.

As shown in FIG. 2, a method 200 of outputting a prompt information of such embodiments may include operation S210 to operation S230.

In operation S210, a type of an auxiliary prompt information is determined in response to a determination that the auxiliary prompt information is required to be output, and the determination that the auxiliary prompt information is required to be output is performed according to a navigation information and an environment information.

According to embodiments of the present disclosure, the navigation information may include, for example, a current location of a vehicle, a current lane, a remaining time required to reach a destination, a remaining distance to the destination, a current vehicle speed, and so on. The environment information may be acquired from, for example, a server supporting an operation of the navigation application, or may be sensed by a sensor on the vehicle or by a roadside device. The environment information may include, for example, a road shape within a predetermined distance range, a lane speed-limit information, a lane turning information, a location of a monitoring device, a location of a traffic light, or the like.

According to embodiments of the present disclosure, it may be determined that the auxiliary prompt information is required to be output, if it is determined according to the navigation information and the environment information that a driving direction of the vehicle is required to be changed at a distant position ahead, or that an unexpected situation affecting a normal driving of the vehicle occurs on the road. It may be understood that the auxiliary prompt information required to be output is a prompt information other than a prompt information output by the navigation application according to an offline map. For different cases in which the auxiliary prompt information is required to be output, a type of the auxiliary prompt information required to be output may be determined. It may be understood that the above cases in which the auxiliary prompt information is required to be output are merely examples to facilitate understanding of the present disclosure, and the present disclosure is not limited thereto.

According to embodiments of the present disclosure, it is possible to preset a mapping relationship between a case in which the auxiliary prompt information is required to be output and the type of the auxiliary prompt information.

In operation S220, an output time of the auxiliary prompt information is determined according to the type of the auxiliary prompt information.

According to embodiments of the present disclosure, the output time of the auxiliary prompt information is set to ensure that an adjustment of a driving parameter of the vehicle performed according to the auxiliary prompt information may not cause a collision risk to vehicle driving. Therefore, for an auxiliary prompt information that may not cause a collision risk (e.g., a deceleration), the auxiliary prompt information may be immediately output. For an auxiliary prompt information that may cause a collision risk (e.g., an information prompting a lane change), the output time may be a time when a driving safety is determined.

For example, for the auxiliary prompt information that may cause a collision risk, it may be firstly determined whether an execution of an operation corresponding to the auxiliary prompt information (such as a lane change operation) is allowed by a current environment. If it is allowed, the output time is an immediate case. Otherwise, the auxiliary prompt information is output when it is determined that the execution of the operation corresponding to the auxiliary prompt information is allowed by the current environment.

In operation S230, the auxiliary prompt information is output in response to the output time being reached.

According to embodiments of the present disclosure, the output auxiliary prompt information is an auxiliary prompt information matched with the auxiliary prompt information determined in operation S210. For example, in such embodiment, after the auxiliary prompt information is determined, a pre-built mapping table for type-auxiliary prompt information may be queried, so as to acquire an auxiliary prompt information matched with a determined type.

For example, an information prompting a lane change may include "please merge into the first lane on the left", "please merge into the left-turn lane" and so on. An information prompting a deceleration may include "please yield to pedestrians", "please control the speed" and so on. In an embodiment, the auxiliary prompt information may also be determined in combination with the environment information. For example, if the environment information indicates that a lane change is required due to a branch road ahead, the information prompting the lane change may include "a branch road ahead for turning left, please merge in advance" and so on.

In an embodiment, for the information prompting a lane change, such embodiments may be implemented to predetermine whether a lane change is required ahead according to the environment information before a conventional navigation application prompts a lane change. If a lane change is required, the lane change may be prompted in advance. In this way, it is possible to avoid a case where the driver misses an opportunity of the lane change due to unfamiliarity with the road.

According to embodiments of the present disclosure, the auxiliary prompt information may be output in a form of voice or image, so as to achieve a purpose of reminding the driver or passenger.

According to the method of outputting the prompt information in embodiments of the present disclosure, the navigation information may be combined with the environment information to provide the driver or passenger of the vehicle with an auxiliary prompt information combined with the environment information, and the auxiliary prompt information may be output at a corresponding output time. In this way, a more refined driving navigation may be provided for the driver, which is convenient for improving an experience of assisted driving. Furthermore, through the setting of the output time, an occurrence of traffic accidents may be reduced to a certain extent.

In an embodiment, the aforementioned environment information may be provided by a map information stored in a server supporting the operation of the navigation application. A road shape of the road ahead may be analyzed in advance according to the environment information, and a lane change may be performed in advance in a case of a ramp, a change in a number of lanes, a forbidden lane, etc. on the road ahead. In this way, it is possible to avoid a case where the driver misses the opportunity to change lanes or drives illegally due to unfamiliarity with the road.

For example, the map information within a predetermined range may be periodically requested from the server. The predetermined range may be a range set according to actual needs, such as 2 kilometers or 3 kilometers, which is not limited in the present disclosure. After the map information is acquired, it is determined according to a first environment sub-information in the map information and the navigation information whether a lane change is required ahead. For example, if a current lane determined according to the navigation information is a front prohibited lane, it may be determined that a lane change operation is required to be performed, and therefore it is determined that the auxiliary prompt information is required to be output and that the type of the auxiliary prompt information is a lane change type. For example, if it is determined according to the first environment sub-information that a ramp exists in front of the vehicle, and it is determined according to the navigation information that the vehicle needs to drive into the ramp and the current lane is not the rightmost lane, it may be determined that a lane change operation is required to be performed, and therefore it is determined that an auxiliary prompt information is required to be output and the type of the auxiliary prompt information is the lane change type.

In this way, when it is determined that the output time of the auxiliary prompt information of the lane change type is reached, an auxiliary prompt information such as "a forbidden lane ahead, please merge in advance" or "drive to the ramp ahead, please merge into the rightmost lane in advance" may be output.

FIG. 3 shows a schematic diagram of a principle of a method of outputting a prompt information according to embodiments of the present disclosure.

In an embodiment, the aforementioned environment information may include not only an environment information in the map information, but also an environment information detected in real time. In such embodiments, the environment information in the map information may be compared with the environment information detected in real time, and the auxiliary prompt information may be output when the two are inconsistent. In this way, it is possible to correct an inaccurate navigation information in advance, and avoid a poor driving experience, a low driving efficiency and even a violation of regulations caused by the inaccurate navigation information.

As shown in FIG. 3, in an embodiment 300, the navigation application may firstly acquire a map information 302 from a server 310 according to a navigation information 301, and determine a first environment sub-information 303 in the map information 302. Besides, the navigation application may receive a detected second environment sub-information 304 transmitted by a vehicle-mounted terminal 320. The second environment sub-information 304 may be obtained by the vehicle-mounted terminal by identifying the information sensed by the sensor of the vehicle or the roadside device.

For example, the determined first environment sub-information 303 may be an information within a predetermined range of a current location of the vehicle, and the predetermined range may be determined according to a sensing range of the roadside device or the sensor of the vehicle. For example, the first environment sub-information and the second environment sub-information may include a lane speed-limit information, a lane turning information, a location of a traffic light, a location of a monitoring device, or the like. The vehicle-mounted terminal may recognize, for example, an image captured by a camera or a roadside device, so as to obtain a traffic indication object such as a road sign and a traffic light in the image. A location information of the traffic indication object and an information indicated by the traffic indication object may also be obtained through a depth of field or other information, and the information may be used as the second environment sub-information 304. The recognition of the image may be performed using a deep learning model such as a target detection model, a character recognition model, an image classification model, and so on.

After the first environment sub-information 303 and the second environment sub-information 304 are obtained, the two may be compared to determine whether the two are consistent or not. If the two are consistent, the first environment sub-information and the second environment sub-information may be acquired again after a predetermined period of time. If the two are inconsistent, it may be determined that an auxiliary prompt information is required to be output.

In an embodiment, the first environment sub-information 303 and the second environment sub-information 304 may each include a plurality of information, and when the two are compared, corresponding information may be compared. For example, the lane speed-limit information in the first environment sub-information 303 may be compared with the lane speed-limit information in the second environment sub-information 304, and the lane turning information in the first environment sub-information may be compared with the lane turning information in the second environment sub-information. Accordingly, the type of the auxiliary prompt information may be determined according to a type 305 of an information in the first environment sub-information 303, the information in the first environment sub-information 303 is inconsistent with a corresponding information in the second environment sub-information 304. In this way, a targeted auxiliary prompt may be provided for the inconsistent information, so that an accuracy of the auxiliary prompt and a user experience may be improved.

For example, when the inconsistent information is a first type 3051 that may not affect a driving direction of the vehicle, it may be determined that the type of the auxiliary prompt information is an error correction type 306. The type of information that does not affect the driving direction of the vehicle may include a lane speed-limit information, a traffic light location information, a monitoring device location information, or the like. When the type of the auxiliary prompt information is the error correction type, the auxiliary prompt information may be immediately output. For example, in this case, the auxiliary prompt information may include "a speed limit of 60 km/h for the current lane, please control the speed", "please note the speed camera at 500 meters ahead" or "a traffic light is at 200 meters ahead, please slow down", and so on.

For example, when the inconsistent information is a second type 3052 that may affect the driving direction of the vehicle, it may be determined that the type of the auxiliary prompt information is a lane change type 307. For example, if the lane turning information in the first environment sub-information 303 is inconsistent with the lane turning information in the second environment sub-information 304, and the lane turning information of the current lane in the second environment sub-information is not matched with the navigation information, it may be determined that the inconsistent information may affect the driving direction of the vehicle, and it is determined that the type of the auxiliary prompt information is the lane change type. For example, if the lane turning information of the current lane in the second environment sub-information indicates that only a left turn is allowed, but the navigation information indicates that the vehicle needs to go straight, it may be determined that the type of the auxiliary prompt information is the lane change type.

In such embodiments, the type of the auxiliary prompt information is determined according to whether the inconsistent information affects the driving direction. When the inconsistent information affects the driving direction, the prompt information prompting the driver to perform the lane change operation may be output according to the output time, so as to avoid a detour and a low driving efficiency caused by the inaccurate map information.

In an embodiment, when it is determined that the first environment sub-information 303 and the second environment sub-information 304 have inconsistent information, whether to output the auxiliary prompt information may also be determined according to a credibility of the second environment sub-information 304. The credibility of the second environment sub-information 304 may be obtained by the aforementioned deep learning model recognizing the second environment sub-information. Specifically, the credibility may be determined according to a probability output by the deep learning model. In an embodiment, the credibility may also be determined according to a definition of the captured image or the like. The probability may be positively correlated with the credibility, and the definition is positively correlated with the credibility.

For example, in such embodiments, only when the credibility of the second environment sub-information is greater than or equal to a credibility threshold, it may be determined that the auxiliary prompt information is required to be output. In this way, it is possible to avoid a false prompt caused by unreliable second environment sub-information, and thus improve the accuracy of information prompt. The credibility threshold may be set according to actual needs. For example, the credibility threshold may be 0.6, etc., which is not limited in the present disclosure.

According to embodiments of the present disclosure, when it is determined that the credibility of the second environment sub-information 304 is less than the credibility threshold, the second environment sub-information may be uploaded to the server as a clue for the server to update the map information.

Figure 4:
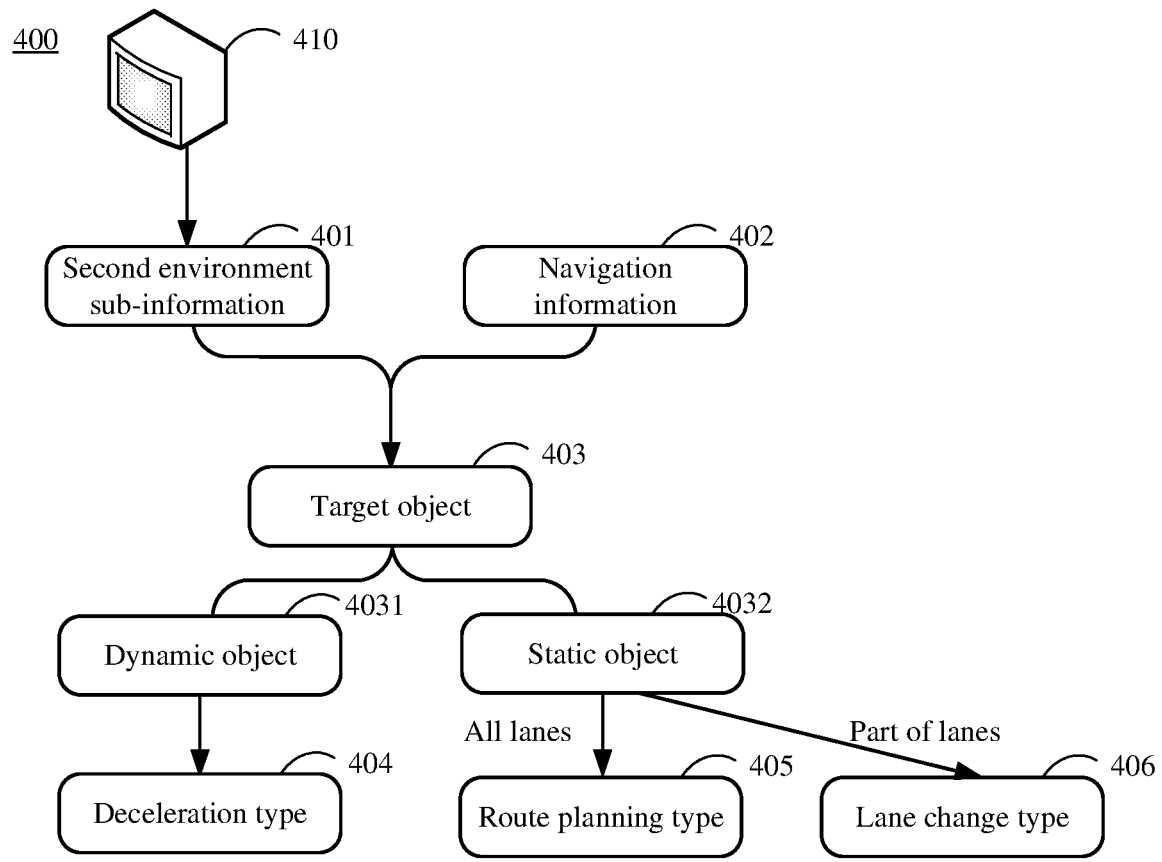
FIG. 4 shows a schematic diagram of a principle of a method of outputting a prompt information according to other embodiments of the present disclosure.

FIG. 4 shows a schematic diagram of a principle of a method of outputting a prompt information according to other embodiments of the present disclosure.

As shown in FIG. 4, in an embodiment 400, the environment information may include a detected second environment sub-information 401, which is specifically an environment information transmitted from the vehicle-mounted terminal 410 to the navigation application. The second environment sub-information 401 is similar to that described above, which will not be repeated here. For example, the second environment sub-information 401 may be obtained by the vehicle-mounted terminal 410 by recognizing an information sensed by a sensor provided therein.

After the second environment sub-information 401 is acquired, it may be determined according to a navigation information 402 and the second environment sub-information 401 whether a target object exists ahead. If a target object 403 exists ahead, it is determined that an auxiliary prompt information is required to be output. The target object may include, for example, a pedestrian, a non-motor vehicle, an obstacle, a faulty vehicle, or the like. Through the output of the auxiliary prompt information, it is possible to timely remind the driver of the existence of the target object ahead, and a corresponding operation may be performed. In this way, an occurrence of traffic accidents may be reduced to a certain extent and a driving efficiency may be improved.

In an embodiment, the type of the auxiliary prompt information may be determined according to an object information of the target object, and different driving operations may be performed for different target objects, so as to further improve a fineness of the auxiliary prompt information and improve an experience of assisted driving.

For example, the object information may include a category of the target object, a size of the target object, a position of the target object on the road, or the like. For example, in such embodiments, the type of the auxiliary prompt information may be determined according to whether the target object is movable. Specifically, in such embodiments, in a case that the target object is a dynamic object 4031, it may be determined that the type of the auxiliary prompt information is a deceleration type 404. In a case that the target object is a static object 4032, it may be determined that the type of the auxiliary prompt information is a lane change type. The dynamic object 4031 is a movable object, which may include, for example, a pedestrian, a non-motor vehicle, or the like, and the static object 4032 may include an obstacle, a faulty vehicle, or the like. Accordingly, when the type of the auxiliary prompt information is the deceleration type, the auxiliary prompt information is immediately output. When the type of the auxiliary prompt information is the lane change type, the output time of the auxiliary prompt information may be determined according to whether it is safe to perform the lane change operation. For example, the auxiliary prompt information of the deceleration type may include "please yield to pedestrians", "non-motor vehicles/pedestrians ahead, please slow down" and so on.

According to embodiments of the present disclosure, when the target object is the static object 4032, such embodiment may be implemented to determine the type of the auxiliary prompt information according to a coverage area of the static object 4032 on the road. For example, in a case that the static object 4032 covers all the lanes on the road in front of the vehicle, it may be determined that the type of the auxiliary prompt information is a route planning type 405 because the vehicle may not continue to drive according to the current navigation information through a lane change. If the static object 4032 merely covers a part of lanes, and the part of lanes includes the current lane where the vehicle is located, then it may be determined that the type of the auxiliary prompt information is a lane change type 406. When the type of the auxiliary prompt information is the route planning type 405, the auxiliary prompt information is immediately output. When the type of the auxiliary prompt information is the lane change type 406, the output time may be determined according to whether it is safe to perform the lane change operation.

When the type of the auxiliary prompt information is the road planning type, the navigation application may, for example, send the object information of the target object to the server, and request the server to re-plan a route. Besides, an auxiliary prompt information "obstacles ahead, the route is being re-planned" may be output. After the navigation application acquires a new planned route sent by the server, it may continue to provide the navigation information according to the new planned route.

In such embodiment, after an existence of a static object is determined, the auxiliary prompt information may be determined according to the coverage area of the static object, so that a refined navigation may be further achieved. By outputting the auxiliary prompt information, it is possible to timely remind the driver not to drive by mistake into a region where the static object is located. In this way, the driving efficiency may be improved to a certain extent, and a road congestion caused by the existence of obstacle may be alleviated to a certain extent.

A principle of determining the output time of the auxiliary prompt information of the lane change type will be described in detail below with reference to FIG. 5. The auxiliary prompt information of the lane change type may be an auxiliary prompt information that is required to be output due to the existence of the static object, an auxiliary prompt information that is required to be output due to the inconsistency between the first environment sub-information and the second environment sub-information, or an auxiliary prompt information that is output when the lane change may be performed in advance due to the need to drive into a ramp.

Figure 5:
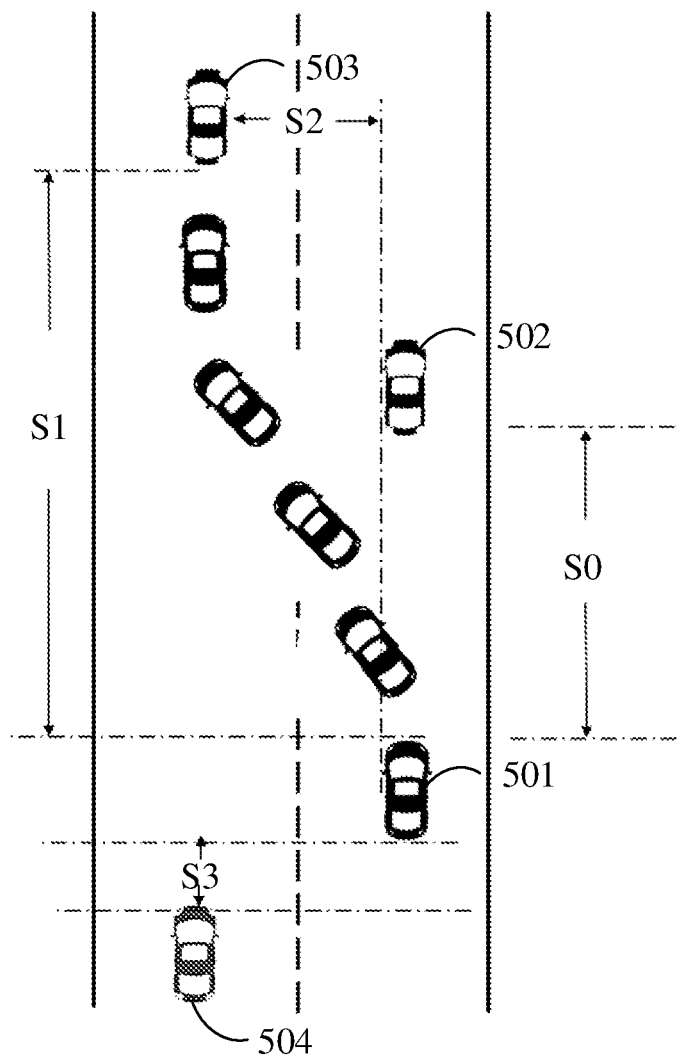
FIG. 5 shows a schematic diagram of a principle of determining an output time of an auxiliary prompt information in response to a type of the auxiliary prompt information being a lane change type according to embodiments of the present disclosure.

FIG. 5 shows a schematic diagram of a principle of determining the output time of the auxiliary prompt information when the type of the auxiliary prompt information is the lane change type according to embodiments of the present disclosure.

According to embodiments of the present disclosure, when the type of the auxiliary prompt information is the lane change type, it may firstly be determined according to a vehicle information of an adjacent vehicle to the vehicle whether a collision risk exists in an execution of the lane change operation. In a case that no collision risk exists, it may be determined that the auxiliary prompt information is immediately output, so as to improve an execution efficiency of the lane change operation. In a case that a collision risk exists, it is possible to determine a strategy by which the vehicle may safely merge. The vehicle information of the adjacent vehicle may be an information sensed by the sensor provided on the vehicle. The vehicle information may include, for example, a position information of vehicle, a lane of vehicle, or the like. The position information may be a position relative to the vehicle that is required to perform the lane change operation.

For example, the adjacent vehicle may include a vehicle in front of the vehicle on the current lane where the vehicle is located, a vehicle behind the vehicle on the current lane, a vehicle in front of the vehicle in a lane direction on a target lane, a vehicle behind the vehicle in the lane direction on the target lane, and so on. The target lane is a lane where the vehicle is located after the lane change is performed. In such embodiments, when no vehicles exist in front of or behind the vehicle in a predetermined region on the target lane, it may be determined that no collision risk exists. A vehicle in front of the vehicle or a vehicle behind the vehicle on the current lane is not taken into account in determining whether a collision risk exists, because a turn indicator light of the current vehicle is visible to a vehicle behind the vehicle on the current lane, and a front vehicle on the current lane is visible to the driver of the current vehicle, so that a collision with the front vehicle or the rear vehicle on the current lane may be avoided. Accordingly, in a case that a vehicle in front of the vehicle and/or a vehicle behind the vehicle exist/exists within the predetermined region on the target lane corresponding to the lane change operation, it may be determined that a collision risk exists in an execution of the lane change operation. Through the method of determining whether a collision risk exists in such embodiments, the efficiency of outputting the auxiliary prompt information may be improved, which may help the driver to change lanes in time and improve the experience of assisted driving.

The predetermined region may be set according to actual needs. For example, in such embodiments, the predetermined range may be determined according to an average value of time lengths required for lane changes obtained through statistics and a speed limit of the lane. If the average value of required time lengths is set to 10 seconds, and the speed limit of the lane is 60 km/h, then the predetermined region may be set as a region of which a distance from the vehicle in the lane direction is less than a target distance. The target distance is a distance that the vehicle travels for 10 seconds at a speed of 60 km/h.

According to embodiments of the present disclosure, if it is determined that a collision risk exists in an execution of the lane change operation, for example, it is possible to determine a time length required for a safe execution of the lane change operation, that is, a time length required by a lane change without a collision from a current time instant. It should be noted that, when determining the time length, the vehicle speed may be set as a fixed value, and the fixed value may be any value not greater than the speed limit of the lane.

As shown in FIG. 5, in an embodiment 500, a vehicle 501 is set as a vehicle that is required to perform a lane change operation, a vehicle 503 is a front vehicle on a target lane (that is, a vehicle located in front of the vehicle 501 in the lane direction on the target lane), a vehicle 504 is a rear vehicle on the target lane (that is, a vehicle located behind the vehicle 501 in the lane direction on the target lane). According to the vehicle information of the adjacent vehicle, it may be determined that a position of the vehicle 503 relative to the vehicle 501 is at a distance S2 to a left side of the vehicle 501 and a distance S1 in front of the vehicle 501. S1 is a distance between the vehicle 503 and the vehicle 501 in the lane direction, and S2 is a distance between the vehicle 503 and the vehicle 501 in a direction perpendicular to the lane. Similarly, a position of the vehicle 504 relative to the vehicle 501 is at a distance S2 to the left side of the vehicle 501 and a distance S3 behind the vehicle 501. Conditions for the vehicle 501 to safely perform the lane change operation may include:

$$v_y \times t < (v_2 \times t + S1 + a); \qquad (1)$$

$$v_y \times t > (v_3 \times t + S1 + a). \qquad (2)$$

where $v_y$ represents a component of a speed of the vehicle 501 in the lane direction, $v_2$ represents a speed of the vehicle 503, $v_3$ represents a speed of the vehicle 504, and a represent a safety distance. $v_y \times t$ is a first distance of the vehicle 501 travelling in the lane direction in a process of the vehicle 501 performing the lane change operation. $v_2 \times t$ is a third distance of the front vehicle 503 on the target lane travelling in the lane direction in the process of the vehicle 501 performing the lane change operation. $v_3 \times t$ is a fourth distance of the rear vehicle 504 on the target lane travelling in the lane direction in the process of the vehicle 501 performing the lane change operation. It may be understood that the process of the vehicle 501 performing the lane change operation starts from a time instant when the vehicle 501 starts to perform the lane change operation, and ends at a time instant when the vehicle 501 completes the lane change operation. The safety distance may be set according to actual needs. For example, the safety distance may generally be set to 50 meters, and the safety distance may be set to 100 meters in heavy foggy days or rainy and snowy days, which is not limited in the present disclosure. $v_y$ may be any value not greater than the speed limit of the lane, and different time lengths may be calculated according to different values of $v_y$. In such embodiments, it may be determined whether the plurality of time lengths include a value less than a predetermined time length. If so, it may be determined that the auxiliary prompt information is immediately output. The predetermined time length may be a value set according to actual needs, such as 10 seconds. In such embodiments, the time length required to perform the lane change operation is limited because an overly long time length may affect a normal driving of the rear vehicle on the lane where the vehicle is located before the lane change is performed, and may even cause a congestion, and a probability of collision may increase. By limiting the required time length, it is possible to improve a road utilization and avoid an occurrence of congestion.

In an embodiment, the condition for the vehicle 501 to safely perform the lane change operation may further include:

$$v_y \times t < (v_1 \times t + S0). \qquad (3)$$

where $v_1$ represents a speed of the vehicle 502 in front of the vehicle 501 on the current lane, and S0 represents a distance between the vehicle 502 and the vehicle 501 in the lane direction. $v_1 \times t$ is a second distance of the vehicle 502 travelling in the lane direction in the process of the vehicle 501 performing the lane change operation. Through the setting of the condition related to the front vehicle on the current lane, it is possible to further ensure a safety in performing the lane change operation, and avoid a collision between the vehicle 501 and the vehicle 502 before the vehicle 501 drives into the target lane.

In an embodiment, when it is determined that a collision risk exists in an execution of the lane change operation, for example, it is possible to limit the vehicle speed during the lane change operation in addition to the time length required for the execution of the lane change operation, so as to ensure a polite driving as much as possible, improve a stability of vehicle driving, and further improve the safety in performing the lane change operation.

For example, if it is determined that a collision risk exists in an execution of the lane change operation, the vehicle speed and the time length required for a safe execution of the lane change may be firstly determined. In a case that the time length is less than a predetermined time length and a difference value between the vehicle speed and a current speed of the vehicle is less than a predetermined difference value, it may be determined that the auxiliary prompt information is immediately output. The predetermined difference value may be, for example, a value of 10% of the current vehicle speed, or may be any value set according to actual needs. For example, the predetermined difference value may be 10 km/h, or the like, which is not limited in the present disclosure.

In an embodiment, when calculating the vehicle speed and the time length, a vehicle speed and a time length that meet the aforementioned conditions for safely performing the lane change operation may be calculated by using the vehicle speed and the time length as variables, so that at least a plurality of vehicle speed-time length pairs may be obtained. It may be determined whether the plurality of vehicle speed-time length pairs include a vehicle speed-time length pair in which a difference value between the vehicle speed and the current vehicle speed is less than the predetermined difference value and the time length is less than the predetermined time length. If so, it may be determined that the auxiliary prompt information is immediately output.

For example, when only a front vehicle exists on the target lane, the condition for safely performing the lane change operation may include only the aforementioned condition (1), or may include the aforementioned conditions (1) and (3). When only a rear vehicle exists on the target lane, the condition for safely performing the lane change operation may include only the aforementioned condition (2), or may include the aforementioned conditions (2) and (3). When both a front vehicle and a rear vehicle exists on the target lane, the conditions for safely performing the lane change operation may include only the aforementioned conditions (1) and (2), or may include the aforementioned conditions (1) to (3).

It may be understood that when an obstacle instead of the vehicle 502 exists in front of the vehicle 501, a value of $v_1$ in the condition (3) is 0. Accordingly, the vehicle 502 in FIG. 5 may be replaced by the aforementioned static object.

It should be noted that the distances S0, S1, S2 and S3 in FIG. 5 are real-time distances when determining the vehicle speed and the time length required for the vehicle 501 to safely perform the lane change operation.

Based on the method of outputting the prompt information provided in the present disclosure, the present disclosure further provides an apparatus of outputting a prompt information. The apparatus will be described in detail below with reference to FIG. 6.

Figure 6:
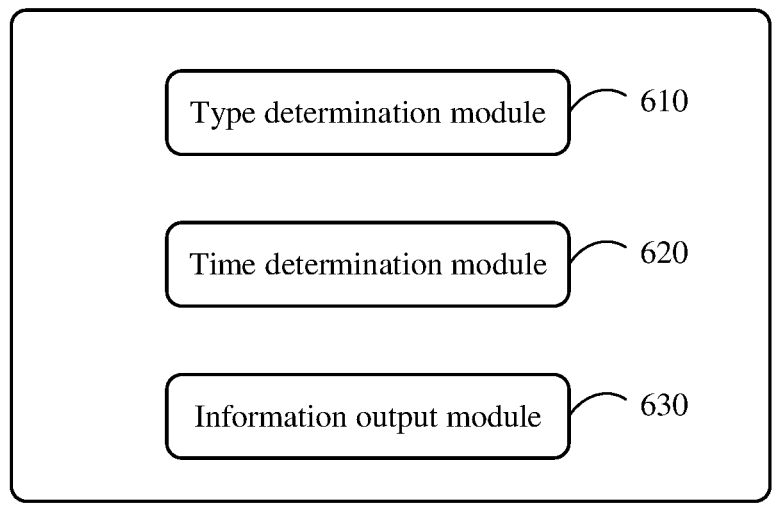
FIG. 6 shows a schematic structural diagram of an apparatus of outputting a prompt information according to embodiments of the present disclosure.

FIG. 6 shows a schematic structural diagram of an apparatus of outputting a prompt information according to embodiments of the present disclosure.

As shown in FIG. 6, an apparatus 600 of outputting a prompt information in such embodiments may include a type determination module 610, a time determination module 620, and an information output module 630.

The type determination module 610 may be used to determine a type of an auxiliary prompt information in response to a determination that the auxiliary prompt information is required to be output, and the determination that the auxiliary prompt information is required to be output is performed according to a navigation information and an environment information. In an embodiment, the type determination module 610 may be used to perform operation S210 described above, which will not be described in detail here.

The time determination module 620 may be used to determine an output time of the auxiliary prompt information according to the type of the auxiliary prompt information. In an embodiment, the time determination module 620 may be used to perform operation S220 described above, which will not be described in detail here.

The information output module 630 may be used to output the auxiliary prompt information in response to the output time being reached. In an embodiment, the information output module 630 may be used to perform operation S230 described above, which will not be described in detail here.

According to embodiments of the present disclosure, the type of the auxiliary prompt information includes a lane change type. The time determination module 620 may include a time-length determination sub-module and a first time determination sub-module. The time-length determination sub-module may be used to determine, for the lane change type, a time length required for a safe execution of a lane change operation, in response to a determination that a collision risk exists in an execution of the lane change operation, and the determination that the collision risk exists in the execution of the lane change operation is performed according to a detected vehicle information of an adjacent vehicle. The first time determination sub-module may be used to determine that the auxiliary prompt information is immediately output, when the time length is less than a predetermined time length.

According to embodiments of the present disclosure, the type of the auxiliary prompt information includes a lane change type. The time determination module 620 may include a lane-change determination sub-module and a second time determination sub-module. The lane-change determination sub-module may be used to determine, for the lane change type, a vehicle speed and a time length required for a safe execution of a lane change operation, in response to a determination that a collision risk exists in an execution of the lane change operation, and the determination that the collision risk exists in the execution of the lane change operation is performed according to a detected vehicle information of an adjacent vehicle. The second time determination sub-module may be used to determine that the auxiliary prompt information is immediately output, when the time length is less than a predetermined time length and a difference value between the vehicle speed and a current vehicle speed is less than a predetermined difference value.

According to embodiments of the present disclosure, the apparatus 600 of outputting the prompt information may further include a risk determination module used to determine that a collision risk exists in an execution of the lane change operation, when a front vehicle and/or a rear vehicle exist/exists in a predetermined region on a target lane corresponding to the lane change operation. The time determination module 620 may be further used to: determine that the auxiliary prompt information is immediately output, in response to a determination that no collision risk exists in an execution of the lane change operation, d the determination that no collision risk exists in the execution of the lane change operation is performed according to a vehicle information of the adjacent vehicle.

According to embodiments of the present disclosure, the lane-change information determination sub-module is used to determine a vehicle speed and a time length required for a safe execution of a lane change operation by using at least two constraint conditions selected from that: in a process of performing the lane change operation, a difference value between a first distance of a current vehicle travelling in a lane direction and a second distance of a front object on a current lane moving in the lane direction is less than a first value, and the first value is determined according to a distance between the current vehicle and the front object in the lane direction before the lane change operation is performed; in the process of performing the lane change operation, a difference value between the first distance and a third distance of a front vehicle on the target lane travelling in the lane direction is less than a second value, and the second value is determined according to a distance between the current vehicle and the front vehicle in the lane direction before the lane change operation is performed and a predetermined safety distance; or in the process of performing the lane change operation, a difference value between a fourth distance of a rear vehicle on the target lane travelling in the lane direction and the first distance is less than a third value, and the third value is determined according to a distance between the rear vehicle and the current vehicle in the lane direction before the lane change operation is performed and a predetermined safety distance. The first distance is determined according to the vehicle speed and the time length; and the front object includes a vehicle or a target object.

According to embodiments of the present disclosure, the apparatus 600 of outputting the prompt information may further include an environment information determination module and an information output determination module. The environment information determination module may be used to determine a first environment sub-information in a map information according to the navigation information. The information output determination module may be used to determine, according to a second environment sub-information detected, whether the auxiliary prompt information is required to be output or not, in response to the first environment sub-information being inconsistent with the second environment sub-information. The type determination module 610 may be further used to determine the type of the auxiliary prompt information according to a type of an information in the first environment sub-information, the information in the first environment sub-information is inconsistent with a corresponding information in the second environment sub-information. The environment information may include the first environment sub-information and the second environment sub-information.

According to embodiments of the present disclosure, the information output determination module may include a first type determination sub-module and a second type determination sub-module. The first type determination sub-module may be used to determine that the type of the auxiliary prompt information is an error correction type, when the information in the first environment sub-information, which is inconsistent with the corresponding information in the second environment sub-information, does not affect a travelling direction. The second type determination sub-module may be used to determine that the type of the auxiliary prompt information is a lane change type in response to a lane turn information for the current lane in the second environment sub-information being not matched with the navigation information, when the information in the first environment sub-information, which is inconsistent with the corresponding information in the second environment sub-information, affects the driving direction. It is determined that the auxiliary prompt information is immediately output, in response to the type of the auxiliary prompt information being the error correction type.

According to embodiments of the present disclosure, the information output determination module may be further used to: determine that the auxiliary prompt information is required to be output, when the second environment sub-information has a credibility greater than or equal to a credibility threshold. The apparatus 600 of outputting the prompt information may further include an information upload module used to upload the second environment sub-information when the credibility of the second environment sub-information is less than the credibility threshold.

According to embodiments of the present disclosure, the environment information includes a first environment sub-information in a map information. The apparatus 600 of outputting the prompt information may further include an information output determination sub-module used to determine that the auxiliary prompt information is required to be output, in response to a determination that a lane change is required ahead, and the determination that the lane change is required ahead is performed according to the navigation information and the first environment sub-information within a predetermined range. The type determination module 610 is further used to determine that the type of the auxiliary prompt information is a lane change type.

According to embodiments of the present disclosure, the environment information includes a detected second environment sub-information. The apparatus 600 of outputting the prompt information may further include an information output determination module used to determine that the auxiliary prompt information is required to be output, in response to a determination that a target object exists ahead, and the determination that the target object exists ahead is performed according to the navigation information and the second environment sub-information. The type determination module 610 is further used to determine the type of the auxiliary prompt information according to an object information of the target object.

According to embodiments of the present disclosure, the type determination module 610 may include a third type determination sub-module and a fourth type determination sub-module. The third type determination sub-module may be used to determine the type of the auxiliary prompt information according to a coverage information of the target object on a road ahead, when the target object is a static object. The fourth type determination sub-module may be used to determine that the type of the auxiliary prompt information is a deceleration type, when the target object is a dynamic object. It is determined that the auxiliary prompt information is immediately output when the type of the auxiliary prompt information is the deceleration type.

According to embodiments of the present disclosure, the third type determination sub-module may include a first determination unit and a second determination unit. The first determination unit may be used to determine that the type of the auxiliary prompt information is a route planning type, when the target object covers all lanes on the road ahead. The second determination unit may be used to determine that the type of the auxiliary prompt information is a lane change type, when the target object covers a part of lanes on the road ahead, and the part of lanes includes the current lane. It is determined that the auxiliary prompt information is immediately output when the type of the auxiliary prompt information is the route planning type.

It should be noted that in the technical solution of the present disclosure, an acquisition, a collection, a storage, a use, a processing, a transmission, a provision, a disclosure and an application of user personal information involved comply with provisions of relevant laws and regulations, take essential confidentiality measures, and do not violate public order and good custom. In the technical solution of the present disclosure, authorization or consent is obtained from the user before the user's personal information is obtained or collected.

According to embodiments of the present disclosure, the present disclosure further provides an electronic device, a readable storage medium, and a computer program product.

Figure 7:
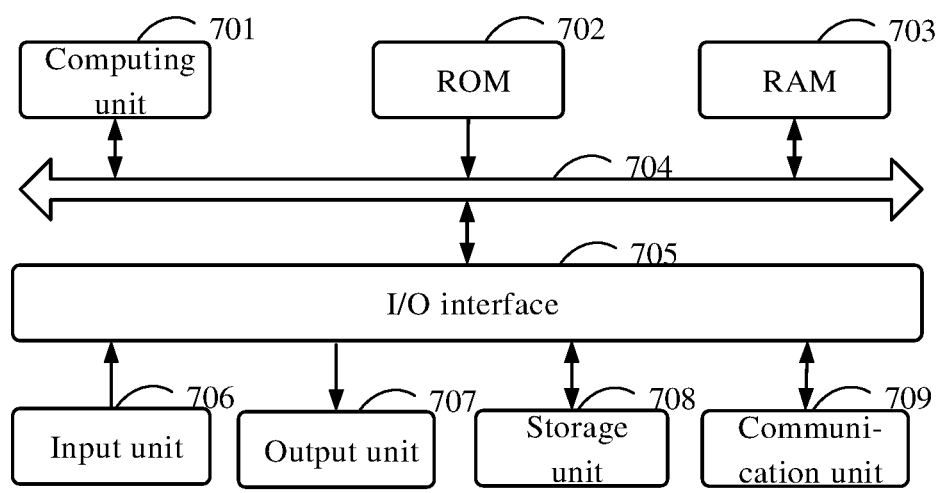
FIG. 7 shows a structural block diagram of an electronic device for implementing a method of outputting a prompt information according to embodiments of the present disclosure.

FIG. 7 shows a schematic block diagram of an example electronic device 700 suitable for implementing the method of outputting the prompt information according to embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the electronic device 700 includes a computing unit 701 which may perform various appropriate actions and processes according to a computer program stored in a read only memory (ROM) 702 or a computer program loaded from a storage unit 708 into a random access memory (RAM) 703. In the RAM 703, various programs and data necessary for an operation of the electronic device 700 may also be stored. The computing unit 701, the ROM 702 and the RAM 703 are connected to each other through a bus 704. An input/output (I/O) interface 705 is also connected to the bus 704.

A plurality of components in the electronic device 700 are connected to the I/O interface 705, including: an input unit 706, such as a keyboard, or a mouse; an output unit 707, such as displays or speakers of various types; a storage unit 708, such as a disk, or an optical disc; and a communication unit 709, such as a network card, a modem, or a wireless communication transceiver. The communication unit 709 allows the electronic device 700 to exchange information/ data with other devices through a computer network such as Internet and/or various telecommunication networks.

The computing unit 701 may be various general-purpose and/or dedicated processing assemblies having processing and computing capabilities. Some examples of the computing units 701 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 701 executes various methods and steps described above, such as the method of outputting the prompt information. For example, in some embodiments, the method of outputting the prompt information may be implemented as a computer software program which is tangibly embodied in a machine-readable medium, such as the storage unit 708. In some embodiments, the computer program may be partially or entirely loaded and/or installed in the electronic device 700 via the ROM 702 and/or the communication unit 709. The computer program, when loaded in the RAM 703 and executed by the computing unit 701, may execute one or more steps in the method of outputting the prompt information described above. Alternatively, in other embodiments, the computing unit 701 may be configured to perform the method of outputting the prompt information by any other suitable means (e.g., by means of firmware).

Based on the electronic device 700, the present disclosure further provides a vehicle including the electronic device 700, and the vehicle may be further provided with the aforementioned sensor or the like, which is not limited in the present disclosure.

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, also known as a cloud computing server or a cloud host, which is a host product in a cloud computing service system to solve shortcomings of difficult management and weak service scalability existing in an existing physical host and VPS (Virtual Private Server) service. The server may also be a server of a distributed system or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of outputting a prompt information, implemented by a vehicle-mounted terminal of a vehicle, the method comprising:
    determining a type of an auxiliary prompt information in response to a determination that the auxiliary prompt information is required to be output, wherein the determination that the auxiliary prompt information is required to be output is performed according to a navigation information and an environment information;
    determining an output time of the auxiliary prompt information according to the type of the auxiliary prompt information; and
    outputting the auxiliary prompt information in response to the output time being reached,
    wherein the type of the auxiliary prompt information comprises a lane change type; and
    wherein the determining the output time comprises:
        determining, for the lane change type, a time length required for a safe execution of a lane change operation, in response to a determination that a collision risk exists in an execution of the lane change operation, wherein the determination that the collision risk exists in the execution of the lane change operation is performed according to a detected vehicle information of an adjacent vehicle; and
        when the time length is less than a predetermined time length, determining that the auxiliary prompt information is immediately output,
        wherein the determining the time length required comprises determining the time length by using at least two constraint conditions selected from:
        in a process of performing the lane change operation, a difference value between a first distance of a current vehicle travelling in a lane direction and a second distance of a front object on a current lane moving in the lane direction is less than a first value, and the first value is determined according to a distance between the current vehicle and the front object in the lane direction before the lane change operation is performed;
        in a process of performing the lane change operation, a difference value between the first distance and a third distance of a front vehicle on the target lane travelling in the lane direction is less than a second value, and the second value is determined according to a distance between the current vehicle and the front vehicle in the lane direction before the lane change operation is performed and a predetermined safety distance; or
        in a process of performing the lane change operation, a difference value between a fourth distance of a rear vehicle on the target lane travelling in the lane direction and the first distance is less than a third value, and the third value is determined according to a distance between the rear vehicle and the current vehicle in the lane direction before the lane change operation is performed and a predetermined safety distance,
    wherein the first distance is determined according to a vehicle speed and the time length, and the front object comprises a vehicle or a target object.

2. The method according to claim 1, wherein the determining the output time further comprises:
    determining, for the lane change type, a vehicle speed and the time length required for the safe execution of the lane change operation, in response to the determination that the collision risk exists in the execution of the lane change operation; and
    when the time length is less than the predetermined time length and a difference value between the vehicle speed and a current vehicle speed is less than a predetermined difference value, determining that the auxiliary prompt information is immediately output.

3. The method according to claim 2, further comprising, when a front vehicle and/or a rear vehicle exist/exists in a predetermined region on a target lane corresponding to the lane change operation, determining that a collision risk exists in an execution of the lane change operation; and
    wherein the determining an output time of the auxiliary prompt information according to the type of the auxiliary prompt information further comprises determining that the auxiliary prompt information is immediately output, in response to a determination that no collision risk exists in an execution of the lane change operation, wherein the determination that no collision risk exists in the execution of the lane change operation is performed according to a vehicle information of the adjacent vehicle.

4. The method according to claim 1, further comprising, when a front vehicle and/or a rear vehicle exist/exists in a predetermined region on a target lane corresponding to the lane change operation, determining that a collision risk exists in an execution of the lane change operation; and
    wherein the determining an output time of the auxiliary prompt information according to the type of the auxiliary prompt information further comprises determining that the auxiliary prompt information is immediately output, in response to a determination that no collision risk exists in an execution of the lane change operation, wherein the determination that no collision risk exists in the execution of the lane change operation is performed according to a vehicle information of the adjacent vehicle.

5. The method according to claim 1, further comprising:
    determining a first environment sub-information in a map information according to the navigation information; and
    determining, according to a second environment sub-information detected, whether the auxiliary prompt information is required to be output or not, in response to the first environment sub-information being inconsistent with the second environment sub-information, and
    wherein the determining the type of the prompt information comprises determining the type of the auxiliary prompt information according to a type of an information in the first environment sub-information, wherein the information in the first environment sub-information is inconsistent with a corresponding information in the second environment sub-information,
    wherein the environment information comprises the first environment sub-information and the second environment sub-information.

6. The method according to claim 5, wherein the determining the type of the auxiliary prompt information according to a type of an information in the first environment sub-information comprises:
when the information in the first environment sub-information, which is inconsistent with the corresponding information in second environment sub-information, does not affect a travelling direction, determining that the type of the auxiliary prompt information is an error correction type; and
when the information in the first environment sub-information, which is inconsistent with the corresponding information in second environment sub-information, affects the driving direction, determining that the type of the auxiliary prompt information is a lane change type in response to a lane turn information for the current lane in the second environment sub-information being not matched with the navigation information,
wherein the auxiliary prompt information is immediately output when the type of the auxiliary prompt information is the error correction type.

7. The method according to claim 5, wherein the determining, according to a second environment sub-information detected, whether the auxiliary prompt information is required to be output or not comprises, when the second environment sub-information has a credibility greater than or equal to a credibility threshold, determining that the auxiliary prompt information is required to be output, and
further comprising, when the credibility of the second environment sub-information is less than the credibility threshold, uploading the second environment sub-information.

8. The method according to claim 1, wherein the environment information comprises a first environment sub-information in a map information,
further comprising determining that the auxiliary prompt information is required to be output, in response to a determination that a lane change is required ahead, wherein the determination that the lane change is required ahead is performed according to the navigation information and the first environment sub-information within a predetermined range, and
wherein the determining the type of the auxiliary prompt information comprises determining that the type of the auxiliary prompt information is a lane change type.

9. The method according to claim 1, wherein the environment information comprises a detected second environment sub-information,
further comprising determining that the auxiliary prompt information is required to be output, in response to a determination that a target object exists ahead, wherein the determination that the target object exists ahead is performed according to the navigation information and the second environment sub-information, and
wherein the determining the type of the auxiliary prompt information comprises determining the type of the auxiliary prompt information according to an object information of the target object.

10. The method according to claim 9, wherein the determining the type of the auxiliary prompt information according to an object information of the target object comprises:
when the target object is a static object, determining the type of the auxiliary prompt information according to a coverage information of the target object on a road ahead; and
when the target object is a dynamic object, determining that the type of the auxiliary prompt information is a deceleration type,
wherein the auxiliary prompt information is immediately output when the type of the auxiliary prompt information is the deceleration type.

11. The method according to claim 10, wherein the determining the type of the auxiliary prompt information according to a coverage information of the target object on a road ahead comprises:
when the target object covers all lanes on the road ahead, determining that the type of the auxiliary prompt information is a route planning type; and
when the target object covers a part of lanes on the road ahead, determining that the type of the auxiliary prompt information is a lane change type, wherein the part of lanes comprises the current lane,
wherein the auxiliary prompt information is immediately output when the type of the auxiliary prompt information is the route planning type.

12. An electronic device, comprising:
at least one processor; and
a memory communicatively connected to the at least one processor, wherein the memory stores instructions executable by the at least one processor, the instructions, when executed by the at least one processor, are configured to cause the at least one processor to at least:
determine a type of an auxiliary prompt information in response to a determination that the auxiliary prompt information is required to be output, wherein the determination that the auxiliary prompt information is required to be output is performed according to a navigation information and an environment information;
determine an output time of the auxiliary prompt information according to the type of the auxiliary prompt information; and
output the auxiliary prompt information in response to the output time being reached,
wherein the type of the auxiliary prompt information comprises a lane change type; and
wherein the instructions are further configured to cause the at least one processor to:
determine, for the lane change type, a time length required for a safe execution of a lane change operation, in response to a determination that a collision risk exists in an execution of the lane change operation, wherein the determination that the collision risk exists in the execution of the lane change operation is performed according to a detected vehicle information of an adjacent vehicle; and
when the time length is less than a predetermined time length, determine that the auxiliary prompt information is immediately output,
wherein the instructions are further configured to cause the at least one processor to determine the time length by using at least two constraint conditions selected from:
in a process of performing the lane change operation, a difference value between a first distance of a current vehicle travelling in a lane direction and a second distance of a front object on a current lane moving in the lane direction is less than a first value, and the first value is determined according to a distance between the current vehicle and the front object in the lane direction before the lane change operation is performed;

in the process of performing the lane change operation, a difference value between the first distance and a third distance of a front vehicle on the target lane travelling in the lane direction is less than a second value, and the second value is determined according to a distance between the current vehicle and the front vehicle in the lane direction before the lane change operation is performed and a predetermined safety distance; or in the process of performing the lane change operation, a difference value between a fourth distance of a rear vehicle on the target lane travelling in the lane direction and the first distance is less than a third value, and the third value is determined according to a distance between the rear vehicle and the current vehicle in the lane direction before the lane change operation is performed and a predetermined safety distance, wherein the first distance is determined according to a vehicle speed and the time length, and the front object comprises a vehicle or a target object.

13. The electronic device according to claim 12, wherein the instructions are further configured to cause the at least one processor to:

determine, for the lane change type, a vehicle speed and the time length required for the safe execution of the lane change operation, in response to the determination that the collision risk exists in the execution of the lane change operation; and when the time length is less than the predetermined time length and a difference value between the vehicle speed and a current vehicle speed is less than a predetermined difference value, determine that the auxiliary prompt information is immediately output.

14. The electronic device according to claim 12, wherein the instructions are further configured to cause the at least one processor to:

when a front vehicle and/or a rear vehicle exist/exists in a predetermined region on a target lane corresponding to the lane change operation, determine that a collision risk exists in an execution of the lane change operation; and determine that the auxiliary prompt information is immediately output, in response to a determination that no collision risk exists in an execution of the lane change operation, wherein the determination that no collision risk exists in the execution of the lane change operation is performed according to a vehicle information of the adjacent vehicle.

15. A vehicle, comprising the electronic device of claim 12.

16. A non-transitory computer-readable storage medium having computer instructions therein, the computer instructions configured to cause a computer system to at least:

determine a type of an auxiliary prompt information in response to a determination that the auxiliary prompt information is required to be output, wherein the determination that the auxiliary prompt information is required to be output is performed according to a navigation information and an environment information;

determine an output time of the auxiliary prompt information according to the type of the auxiliary prompt information; and output the auxiliary prompt information in response to the output time being reached, wherein the type of the auxiliary prompt information comprises a lane change type; and wherein the computer instructions are further configured to cause the computer system to:

determine, for the lane change type, a time length required for a safe execution of a lane change operation, in response to a determination that a collision risk exists in an execution of the lane change operation, wherein the determination that the collision risk exists in the execution of the lane change operation is performed according to a detected vehicle information of an adjacent vehicle; and when the time length is less than a predetermined time length, determine that the auxiliary prompt information is immediately output, wherein the computer instructions are further configured to cause the computer system to determine the time length by using at least two constraint conditions selected from:

in a process of performing the lane change operation, a difference value between a first distance of a current vehicle travelling in a lane direction and a second distance of a front object on a current lane moving in the lane direction is less than a first value, and the first value is determined according to a distance between the current vehicle and the front object in the lane direction before the lane change operation is performed;

in a process of performing the lane change operation, a difference value between the first distance and a third distance of a front vehicle on the target lane travelling in the lane direction is less than a second value, and the second value is determined according to a distance between the current vehicle and the front vehicle in the lane direction before the lane change operation is performed and a predetermined safety distance; or in a process of performing the lane change operation, a difference value between a fourth distance of a rear vehicle on the target lane travelling in the lane direction and the first distance is less than a third value, and the third value is determined according to a distance between the rear vehicle and the current vehicle in the lane direction before the lane change operation is performed and a predetermined safety distance, wherein the first distance is determined according to a vehicle speed and the time length, and the front object comprises a vehicle or a target object.

17. The non-transitory computer-readable storage medium according to claim 16, wherein the instructions are further configured to cause the computer system to:

determine, for the lane change type, a vehicle speed and the time length required for the safe execution of the lane change operation, in response to the determination that the collision risk exists in the execution of the lane change operation; and when the time length is less than the predetermined time length and a difference value between the vehicle speed and a current vehicle speed is less than a predetermined difference value, determine that the auxiliary prompt information is immediately output.

18. The non-transitory computer-readable storage medium according to claim 16, wherein the instructions are further configured to cause the computer system to:

when a front vehicle and/or a rear vehicle exist/exists in a predetermined region on a target lane corresponding to the lane change operation, determine that a collision risk exists in an execution of the lane change operation; and determine that the auxiliary prompt information is immediately output, in response to a determination that no collision risk exists in an execution of the lane change operation, wherein the determination that no collision risk exists in the execution of the lane change operation is performed according to a vehicle information of the adjacent vehicle.

19. The non-transitory computer-readable storage medium according to claim 16, wherein the instructions are further configured to cause the computer system to:
  determine a first environment sub-information in a map information according to the navigation information; and
  determine, according to a second environment sub-information detected, whether the auxiliary prompt information is required to be output or not, in response to the first environment sub-information being inconsistent with the second environment sub-information, and
  wherein the determination of the type of the prompt information comprises determination of the type of the auxiliary prompt information according to a type of an information in the first environment sub-information, wherein the information in the first environment sub-information is inconsistent with a corresponding information in the second environment sub-information,
  wherein the environment information comprises the first environment sub-information and the second environment sub-information.

20. The non-transitory computer-readable storage medium according to claim 16, wherein the environment information comprises a first environment sub-information in a map information, and wherein the instructions are further configured to cause the computer system to determine that the auxiliary prompt information is required to be output, in response to a determination that a lane change is required ahead, wherein the determination that the lane change is required ahead is performed according to the navigation information and the first environment sub-information within a predetermined range, and
  wherein the determination of the type of the auxiliary prompt information comprises determination that the type of the auxiliary prompt information is a lane change type.

* * * * *